United States Patent
Neff

(10) Patent No.: US 11,312,816 B2
(45) Date of Patent: Apr. 26, 2022

(54) THERMOPLASTIC POLYURETHANE AND COMPOSITE ARTICLE

(71) Applicant: BASF SE, Ludwigshafen am Rhein (DE)

(72) Inventor: Raymond A. Neff, Bloomfield Hills, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/500,834

(22) PCT Filed: Apr. 12, 2018

(86) PCT No.: PCT/US2018/027242
§ 371 (c)(1),
(2) Date: Oct. 4, 2019

(87) PCT Pub. No.: WO2018/191459
PCT Pub. Date: Oct. 18, 2018

(65) Prior Publication Data
US 2020/0095369 A1 Mar. 26, 2020

Related U.S. Application Data

(60) Provisional application No. 62/484,581, filed on Apr. 12, 2017.

(51) Int. Cl.
*C08G 18/76* (2006.01)
*C08G 18/24* (2006.01)
(Continued)

(52) U.S. Cl.
CPC .......... *C08G 18/7671* (2013.01); *B29C 45/16* (2013.01); *B60C 1/00* (2013.01);
(Continued)

(58) Field of Classification Search
CPC .. C08G 18/10; C08G 18/4238; C08G 18/698; C08G 18/7671; B32B 2250/03; B32B 2250/24
(Continued)

(56) References Cited

U.S. PATENT DOCUMENTS 5,115,073 A * 5/1992 Meckel .............. C08G 18/0804
521/126
5,900,439 A * 5/1999 Prissok ................ C08G 18/003
521/128
(Continued)

FOREIGN PATENT DOCUMENTS

CN 1092783 A 9/1994
CN 1275998 A 12/2000
(Continued)

OTHER PUBLICATIONS

Wicks "Blocked isocyanates III Part B: Uses and applications of blocked isocyanates." Progress in Organic Coatings 41 (2001) 1-83 (Year: 2001).*
(Continued)

*Primary Examiner* — Tri V Nguyen
(74) *Attorney, Agent, or Firm* — DLA Piper LLP (US)

(57) ABSTRACT

A thermoplastic polyurethane is the reaction product of a polybutadiene diol, a polyester diol, and a isocyanate component. The polybutadiene diol has a weight average molecular weight ($M_w$) of from 200 to 20,000 g/mol. The polyester diol has a melting point of from 40 to 90° C. The reactants allow the thermoplastic polyurethane itself to have a melt flow index measured at 120° C. and 22.6 kg of from 0.1 to 200 grams, per 10 minutes as measured according to ASTM 1238. The thermoplastic polyurethane also has a melting point of from 50 to 300° C. The thermoplastic polyurethane is used to form a composite article.

14 Claims, 1 Drawing Sheet

(51) Int. Cl.
  *C08G 18/42* (2006.01)
  *C08G 18/69* (2006.01)
  *C08G 18/10* (2006.01)
  *B60C 1/00* (2006.01)
  *B29C 45/16* (2006.01)

(52) U.S. Cl.
  CPC ........... *C08G 18/10* (2013.01); *C08G 18/244* (2013.01); *C08G 18/4238* (2013.01); *C08G 18/698* (2013.01); *B32B 2250/03* (2013.01); *B32B 2250/24* (2013.01)

(58) Field of Classification Search
  USPC ........ 525/89, 90, 92; 528/65, 75; 428/423.1, 428/423.7, 423.9
  See application file for complete search history.

(56) References Cited

U.S. PATENT DOCUMENTS 6,054,533 A    4/2000  Farkas et al.
6,323,299 B1*  11/2001 Handlin ................. C08G 18/10
                                                525/123
2010/0292403 A1* 11/2010 Ansems ................ C08F 287/00
                                                525/125
2016/0369096 A1* 12/2016 Rolland ............. C08G 18/4854

FOREIGN PATENT DOCUMENTS

JP    2006-160921 A    6/2006
JP    2016-108510 A    6/2016
WO       99/19406     4/1999
WO    2009/017868 A1   2/2009

OTHER PUBLICATIONS

International Search Report and Written Opinion from counterpart International Application No. PCT/US2018/027242 dated Jun. 20, 2018.
First Office Action from corresponding Chinese Patent Appln. No. 201880024380.9 dated May 19, 2021, and its English translation.
The Second Office Action from corresponding Chinese Patent Application No. 201880024380,9 dated Dec. 23, 2021, along with a brief English summary.
Office Action corresponding Japanese Patent Application No. 2019-556171 dated Mar. 1, 2022, and its English tradition.

* cited by examiner

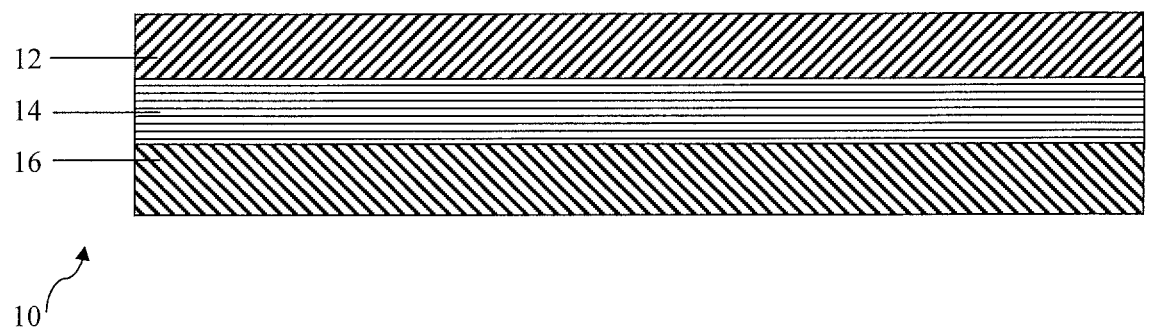

THERMOPLASTIC POLYURETHANE AND COMPOSITE ARTICLE

FIELD OF THE DISCLOSURE

This disclosure generally relates to a thermoplastic polyurethane and a composite article formed therefrom. More specifically, this disclosure relates to a thermoplastic polyurethane that has a particular melt flow index.

BACKGROUND

It is well known in the art that thermoplastic polyurethanes (TPUs) typically have high melting and processing points such that they can be difficult to work with in certain applications. Moreover, it is also known that TPUs generally do not adhere to rubbers, such as rubbers used in shoe soles and in automobile tires.

To solve this problem, one solution has been to use tie-layers to adhere the TPU to the rubber. For example, the tie layer could be formed such that it will adhere to many TPUs and also to rubber after cross-vulcanization of the unvulcanized rubber and the TPU. However, such a process requires pre-compounding sulfur and other vulcanization additives into the TPU. This is problematic because typical TPUs require extrusion above 150° C. while vulcanization reactions tends to initiate at 130° C. For this reason, vulcanization reactions tend to occur prematurely during extrusion thereby ruining the final product. As a result, vulcanization additives typically cannot be pre-compounded with TPUs without initiation of unwanted vulcanization. For this reason, there remains an opportunity for improvement.

BRIEF DESCRIPTION OF THE FIGURES

Other advantages of the present disclosure will be readily appreciated, as the same becomes better understood by reference to the following detailed description when considered in connection with the accompanying drawings wherein FIG. 1 is a cross-sectional view of one embodiment of the composite article of this disclosure.

SUMMARY OF THE DISCLOSURE

This disclosure provides a thermoplastic polyurethane that is the reaction product of a polybutadiene diol, a polyester diol, and a isocyanate component. The polybutadiene diol has a weight average molecular weight ($M_w$) of from 200 to 20,000 g/mol. The polyester diol has a melting point of from 40 to 90° C. The reactants allow the thermoplastic polyurethane itself to have a melt flow index measured at 120° C. and 22.6 kg of from 0.1 to 200 grams, per 10 minutes as measured according to ASTM 1238. The thermoplastic polyurethane also has a melting point of from 50 to 300° C.

This disclosure further provides a composite article. The composite article includes a first layer including a first thermoplastic polyurethane, a second layer including a rubber, and a tie layer sandwiched between and disposed in direct contact with both the first and second layers and including a second thermoplastic polyurethane. The second thermoplastic polyurethane is the reaction product of the polybutadiene diol, the polyester diol, and the isocyanate component. The second thermoplastic polyurethane also includes a vulcanizing additive in an amount of from 1 to 5 parts by weight per 100 parts by weight of the second thermoplastic polyurethane. The second thermoplastic polyurethane has a melt flow index measured at 120° C. and 22.6 kg of from 0.1 to 200 grams, per 10 minutes as measured according to ASTM 1238 and has a melting point of from 50 to 300° C.

This disclosure also provides a method of forming the composite article. The method includes the steps of providing the first thermoplastic polyurethane, the second thermoplastic polyurethane, and the rubber, extruding the second thermoplastic polyurethane at a temperature of less than 130° C., disposing the first thermoplastic polyurethane on and in direct contact with the second thermoplastic polyurethane, disposing the rubber on and in direct contact with the second thermoplastic polyurethane, and heating the combination of the first thermoplastic polyurethane, the second thermoplastic polyurethane, and the rubber at a temperature of greater than or equal to 130° C. to cure the first and second thermoplastic polyurethanes, vulcanize the rubber, and form the composite article.

DETAILED DESCRIPTION OF THE DISCLOSURE

This disclosure provides a thermoplastic polyurethane (TPU), a composite article (10) that includes the TPU, and a method of forming the composite article (10). The TPU and the composite article (10) can be used in any industry. For example, the TPU and/or composite article (10) can be used in shoe soles, tires, hose jacketing, wire and cable jacketing, wheels and caster tires, conveyor belts, mechanical goods, sporting goods, appliances and furniture, animal tags, golf balls, and disc covers. One non-limiting embodiment of the composite article (10) is shown in FIG. 1.

Thermoplastic Polyurethane (TPU):

Thermoplastic polyurethanes (TPUs) are typically multi-block copolymers with hard and soft segments. The hard segments can be produced by a poly-addition reaction of an isocyanate component with a polybutadiene diol and a polyester diol of this disclosure. Usually, the soft segments form an elastomer matrix which gives the TPUs elastic properties. The hard segments typically act as multifunctional tie points that function both as physical crosslinks and reinforcing fillers.

In this disclosure, the TPU is the reaction product of a polybutadiene diol having a weight average molecular weight ($M_w$) of from 200 to 20,000 g/mol; a polyester diol having a melting point of from 40 to 90° C., and an isocyanate component. Physical properties of the TPU can be tailored to different end uses by adjusting a nature and an amount of the isocyanate, the polybutadiene diol, and the polyester diol, each described in greater detail below.

The TPU typically has a weight average molecular weight of from 20,000 to 1,000,000, g/mol. In various embodiments, the weight average molecular weight is from 25,000 to 500,000, 40,000 to 300,000, 50,000 to 275,000, 75,000 to 250,000, 100,000 to 225,000, 125,000 to 200,000, or 150,000 to 175,000, g/mol. The TPU also typically has a vicat softening point of from 30 to 100° C., as determined by ASTM D1525-09. In various embodiments, the vicat softening point is from 50 to 100, 45 to 95, 55 to 95, 60 to 90, 65 to 85, 70 to 80, 70 to 75, 75 to 80, or 50 to 80, ° C. Typically, the vicat softening point is less than the melting point. In other embodiments, the TPU has a melting point of from 50 to 300° C. In various embodiments, the melting point is from 50 to 120, 55 to 115, 60 to 110, 65 to 105, 70 to 100, 75 to 95, 80 to 90, or 85 to 95, ° C. In further embodiments, the TPU has a Shore A Hardness of from 50 A to 90 A as determined by ASTM D2240. In various embodiments, the Shore A Hardness is from 60 A to 85 A. In other embodiments, the TPU has a specific gravity of from 0.8 to 1.2, g/cm³. In various embodiments, the specific gravity is from 0.9 to 1.1, g/cm³. The TPU of this disclosure also has a melt flow index measured at 120° C. and 22.6 kg of from 0.1 to 200 grams, per 10 minutes as measured according to ASTM 1238. In other embodiments, the melt flow index is measured at 120° C. and 22.6 kg and is of from 0.2 to 50, 0.5 to 50, 5 to 50, 10 to 45, 15 to 40, 20 to 35, 25 to 30, 1 to 10, 1 to 5, 5 to 10, or 3 to 5, grams, per 10 minutes as measured according to ASTM 1238. In further embodiments, the TPU has a tensile strength of from 0.01 to 10 MPa at 23° C. as determined by ASTM D412. In various embodiments, the tensile strength is from 0.05 to 5 MPA. In additional embodiments, the TPU has an elastic modulus of from 0.01 to 1 MPa, at 23° C. as determined by ASTM D412. In other embodiments, the elastic modulus is from 0.05 to 0.5 MPa, e.g. as determined by standard methods known in the art. In other embodiments, the elongation (either at peak stress or at break) can be greater than 100%, greater than 300%, greater than 500%, or from 500 to 1500%, or any range including or between the aforementioned values, e.g. as determined by standard methods known in the art. In one embodiment, the TPU has a melt flow index measured at 120° C. and 22.6 kg of from 0.5 to 50 grams, per 10 minutes as measured according to ASTM 1238. In another embodiment, the TPU has a melt flow index measured at 120° C. and 22.6 kg of from 3 to 5 grams, per 10 minutes as measured according to ASTM 1238 and has a melting point of from 90 to 100° C. In various non-limiting embodiments, all values and ranges of values including and between each of those set forth above are hereby expressly contemplated for use. In other words, any values or ranges of values of any one or more of the aforementioned physical properties may describe one or more non-limiting embodiments. All combinations of the aforementioned physical properties are hereby expressly contemplated in various non-limiting embodiments.

Polybutadiene Diol:

Referring back, the polybutadiene diol has a weight average molecular weight ($M_w$) of from 200 to 20,000 g/mol. In various embodiments, the weight average molecular weight is from 1,000 to 10,000, 2,000 to 9,000, 3,000 to 8,000, 4,000 to 7,000, 5,000 to 6,000, 1,000 to 5,000, 1,500 to 3,500, 2,000 to 3,000, 2,000 to 2,500, or 2,500, to 3,000, g/mol. In various embodiments, all values and ranges of values including and between those described above are hereby expressly contemplated for use herein. A single polybutadiene diol or a combination of two or more polybutadiene diols may be used each having a weight average molecular weight ($M_w$) of from 200 to 20,000 g/mol.

In various embodiments, the polybutadiene diol is as described in U.S. Pat. No. 7,405,259, which is expressly incorporated herein by reference in its entirety, as related to polybutadiene diols, in various non-limiting embodiments. In other words, the instant disclosure may utilize any polybutadiene diol described therein.

Polyester Diol:

The polyester diol has a melting point of from 40 to 90° C. In various embodiments, the melting point is from 45 to 85, 50 to 80, 55 to 75, 60 to 70, or 65 to 70, ° C. The polyester diol may be any in the art that has this melting point. In various embodiments, the polyester diol is poly 1,6-hexanediol adipate. The polyester diol may have a weight average molecular weight of from 2,000 to 5,000, 2,500 to 4,500, 3,000 to 4,000, or 3,000 to 3,500, g/mol. A single polyester diol may be utilized or a combination of two or more polyester diols each having a melting point of from 40 to 90° C. may be used. All values and ranges of values including and between those set forth above are hereby expressly contemplated for use in various non-limiting embodiments.

In other embodiments, the polyester diol has the following structure:

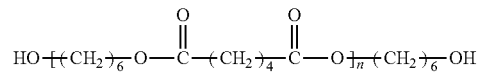

wherein n is from 15 to 25, e.g. about 18-20.

Isocyanate Component:

The isocyanate component may be or include a single isocyanate or a combination of two or more isocyanates. For example, the isocyanate component may be or include a diisocyanate which itself may be a single diisocyanate or may include a combination of two or more diisocyanates.

In one embodiment, the isocyanate component includes an n-functional isocyanate. In this embodiment, n is a number typically from 2 to 5, alternatively from 2 to 4, and most typically from 2 to 3. It is to be understood that n may be an integer or may have intermediate values from 2 to 5. The isocyanate component may include an isocyanate selected from the group of aromatic isocyanates, aliphatic isocyanates, and combinations thereof. In another embodiment, the isocyanate component is or includes an aliphatic isocyanate such as hexamethylene diisocyanate, H12MDI, and combinations thereof.

If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof.

The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylene polyoxyethylene glycols, polyesterols, polycaprolactones, and combinations thereof.

Alternatively, the isocyanate component may be or include an aromatic isocyanate. If the isocyanate component includes an aromatic isocyanate, the aromatic isocyanate may correspond to the formula R'(NCO)z wherein R' is aromatic and z is an integer that corresponds to the valence of R'. Typically, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate (4,4'-methylenediphenyl isocyanate), polymethylene polyphenylene polyisocyanate, corresponding isomeric mixtures thereof, and combinations thereof. Alternatively, the aromatic isocyanate may be or include a triisocyanate product of m-TMXDI and 1,1,1-trimethylolpropane, a reaction product of toluene diisocyanate and 1,1,1-trimethyolpropane, and combinations thereof. In one embodiment, the isocyanate component is or includes a diisocyanate selected from the group of methylene diphenyl diisocyanates, toluene diisocyanates, hexamethylene diisocyanates, H12MDIs, and combinations thereof.

In one embodiment, the isocyanate component has a maximum 85.7 wt % of NCO content. The isocyanate component may also react with the polybutadiene diol and/or the polyester diol in any amount, as determined by one skilled in the art. Typically, the isocyanate component and the polybutadiene diol and/or the polyester diol are reacted at an isocyanate index of from 90 to 115, alternatively from 95 to 105, and alternatively from 105 to 110.

The TPU itself is typically free from cells characteristic of foams, and is typically formed in the absence of cell formation through action of blowing agents. In other embodiments, the TPU is free of a reaction product of one or more diols having 10 or less carbon atoms with the isocyanate component, e.g. short chain diols having 10, 9, 8, 7, 6, 5, 4, 3, or 2, carbon atoms. For example, the TPU may be free of any reaction products formed using butane diol and/or hexane diol.

Method of Forming the TPU:

The TPU may be formed by any method known in the art. For example, the method of forming the TPU may include the steps of providing the polybutadiene diol, providing the polyester diol, and providing the isocyanate component. The method may also include the step of reacting the polybutadiene diol, the polyester diol, and the isocyanate component. The time of reaction, order of addition, and reaction conditions may be chosen by one of skill in the art. Any one or more typical catalysts may be used.

In various embodiments, one or more of the following steps may be utilized. In one embodiment, the polyols are charged into a container and preheated to about 80° C. 4,4' methylene diphenyl diisocyanate (MDI) can then be combined with the polyols using a mixer. The mixture can then be heated and/or cured, e.g. in an over at about 100° C. for about 20 hours. The material can then be granulated using a grinder in preparation for additional processing.

TPU Composition:

This disclosure also provides a TPU composition. For example, the TPU composition may include a single TPU or may include or be two or more TPUs combined or mixed together, so long as one or more of the TPUs is as described above. The additional TPU may be any known in the art such as a polyether TPU or a polyester TPU. The TPU composition may be substantially free from other polymers known in the art (including polyamides, TPUs that fall outside of the scope of this disclosure, foamed polyurethanes, any and all polymers, rubbers, etc.), fillers known in the art (including reinforcing fillers), and plasticizers known in the art. The terminology "substantially free," as used immediately above, refers to an amount of less than 0.1, alternatively of less than 0.01, and most typically of less than 0.001, parts by weight per 100 parts by weight of the TPU. The TPU composition may also be completely free of one or more of the aforementioned compounds.

Vulcanizing Additive:

In various embodiments, the TPU and/or the TPU composition may include a vulcanizing additive. The vulcanizing additive is not particularly limited and may be any known in the art. The vulcanizing additive may include sulfur. The vulcanizing additive may be any known in the art that includes sulfur. The vulcanizing additive may be present in any amount, e.g. from 1 to 5, 1 to 4.5, 2 to 4, 2.5 to 3.5, or 2.5 to 3, parts by weight per 100 parts by weight of the TPU. All values and ranges of values including and between those set forth above are hereby expressly contemplated for use in various non-limiting embodiments.

Composite Article:

The disclosure also provides a composite article (10), as shown in FIG. 1. The composite article (10) may include a first layer (12) including a first thermoplastic polyurethane (first TPU); a second layer (16) including a rubber, and a tie layer (14) sandwiched between and disposed in direct contact with both the first and second layers (12, 16) and including a second thermoplastic polyurethane (second TPU, i.e., the TPU of this disclosure).

First Thermoplastic Polyurethane of the Composite Article:

The first TPU may be any known in the art. In various embodiments, the first TPU includes or is the reaction product of a polyol and an isocyanate, which may be any isocyanate known in the art including, but not limited to, those described above. In one embodiment, the first TPU is the polyester-based TPU and includes the reaction product of a polyester polyol and an isocyanate. Suitable polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Glycols that are suitable for use in producing the polyester polyols may be selected from the group of, but are not limited to, ethylene glycol, butylene glycol, hexanediol, bis(hydroxymethylcyclohexane), 1,4-butanediol, diethylene glycol, 2,2-dimethyl propylene glycol, 1,3-propylene glycol, and combinations thereof. Specific examples of suitable polyester-based TPUs that may be used include, but are not limited to, Elastollan® 600, 800, B, C, and S Series polyester-based TPUs commercially available from BASF Corporation.

Alternatively, the first TPU may be a polyether-based TPU and include the reaction product of a polyether polyol and an isocyanate, as described above. Suitable polyether polyols may be selected from the group of, but are not limited to, polytetramethylene glycol, polyethylene glycol, polypropylene glycol, and combinations thereof. Specific examples of suitable polyether-based TPUs that may be used in this invention include, but are not limited to, Elastollan® 1100 and 1200 Series polyether-based TPUs commercially available from BASF Corporation.

In an alternative embodiment, the first TPU further includes the reaction product of a chain extender, in addition to the polyester polyols or polyether polyols in the polyester-based or polyether-based TPUs, respectfully. In yet another alternative embodiment, the first TPU may comprise the reaction product of the chain extender and the isocyanate in the absence of polyester polyols and/or polyether polyols. Suitable chain extenders may be selected from the group of, but are not limited to, diols including ethylene glycol, propylene glycol, butylene glycol, 1,4-butanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, and thiodiglycol; diamines including ethylene diamine, propylene diamine, butylene diamine, hexamethylene diamine, cyclohexalene diamine, phenylene diamine, tolylene diamine, xylylene diamine, 3,3'-dichlorobenzidine, and 3,3'-dinitrobenzidine; alkanol amines including ethanol amine, aminopropyl alcohol, 2,2-dimethyl propanol amine, 3-aminocyclohexyl alcohol, and p-aminobenzyl alcohol; and combinations of any of the aforementioned chain extenders.

Typically, the polyol used to form the first TPU has a weight average molecular weight of from 600 to 2,500 g/mol. It is to be appreciated that when multiple polyols are used to form the first TPU, each of the polyols typically has a weight average molecular weight within the above range. However, the polyol used to form the first TPU is not limited to this molecular weight range.

Second Thermoplastic Polyurethane of the Composite Article:

The second TPU is the reaction product of the polybutadiene, the polyester diol, and the isocyanate component, e.g. as described in detail above. The second TPU of the composite article (10) also typically includes, but does not necessarily include, the vulcanizing additive. It is contemplated that, in place of the vulcanizing additive, the second TPU of the composite article (10) may include the reaction product or degradation product of the vulcanizing additive that exists after vulcanization with the aforementioned rubber.

Rubber of the Composite Article:

The rubber of the composite article (10) may be any in the art. For example, the rubber may be nitrile (acrylonitrile-butadiene) rubber, hydrogenated nitrile (hydrogenated acrylonitrile-butadiene) rubber, ethylene-propylene (ethylene propylene diene) rubber, fluorocarbon rubber, chloroprene rubber, silicone rubber, fluorosilicone rubber, polyacrylate rubber, ethylene acrylic rubber, styrene-butadiene rubber, polyurethane rubber, natural rubber, and combinations thereof.

First Layer of the Composite Article:

The first layer (12) of the composite article (10) may be or include the first TPU, as described above. The first layer (12) may be free of other polymers of any type and/or free of any inorganic materials, fillers, particles, etc. The first layer (12) is not limited in size or shape but typically has a thickness of from 0.02 to 4 mm, from 0.05 to 3 mm, or from 0.2 to 2 mm. The first layer (12) may be an internal layer of a larger structure or may be an outermost layer, e.g. a first outermost layer. The terminology "outermost" describes an embodiment wherein the first layer (12) is an exterior layer of a larger structure, such as the composite article (10). Typically, the exterior layer faces the environment and is not encapsulated or otherwise covered by any other layer.

Second Layer of the Composite Article:

The second layer (16) of the composite article (10) may be or include the rubber, as described above. The rubber may be cured or uncured (vulcanized or not vulcanized). The second layer (16) may be free of other polymers of any type and/or free of any inorganic materials, fillers, particles, etc. The second layer (16) is not limited in size or shape but typically has a thickness of from 0.05 to 4 mm, from 0.1 to 3 mm, or from 0.2 to 2 mm. The second layer (16) may be an internal layer of a larger structure or may be an outermost layer, e.g. a second outermost layer. The terminology "outermost" describes an embodiment wherein the second layer (16) is an exterior layer of a larger structure, such as the composite article (10). Typically, the exterior layer faces the environment and is not encapsulated or otherwise covered by any other layer.

Tie Layer of the Composite Article:

The tie layer (14) of the composite article (10) may be or include the second TPU, as described above. Similarly, the tie layer (14) of the composite article (10) may be or include the TPU of this disclosure. The tie layer (14) may be free of other polymers of any type and/or free of any inorganic materials, fillers, particles, etc. The tie layer (14) is not limited in size or shape but typically has a thickness of from 0.001 to 1 mm, from 0.01 to 0.5 mm, or from 0.02 to 0.25 mm. The tie layer (14) is sandwiched between the first and the second layer (12, 16) such that the tie layer (14) directly contacts the first and second layers (12, 16). There is no intermediate layer between the first layer (12) and the tie layer (14) or between the second layer (16) and the tie layer (14). In other words, the composite article (10) is or includes three layers, i.e., the first layer (12) disposed directly on and in direct contact with the tie layer (14), the tie layer (14) disposed between and in direct contact with the first and second layer (12, 16), and the second layer (16) disposed on and in direct contact with the tie layer (14). The composite article (10) of three layers may be part of a larger structure that includes more than three layers.

In further embodiments, the composite article (10) is used in a larger structure wherein there are a series of thermoplastic polyurethane layers disposed on and in direct contact with the first layer (12) such that the first layer (12) of the composite article (10) is not an outermost layer but instead is an interior layer of a larger and more complex structure. As just one example, there may be up to 60 or more sheets of thermoplastic polyurethane disposed on the first layer (12).

Method of Forming the Composite Article:

The disclosure also provides a method of forming the composite article (10). The method includes the steps of providing the first thermoplastic polyurethane, providing the second thermoplastic polyurethane, providing the rubber, extruding the second thermoplastic polyurethane at a temperature of less than 130° C. to form the tie layer (14), disposing the first thermoplastic polyurethane on and in direct contact with the tie layer (14), disposing the rubber on and in direct contact with the tie layer (14), and heating the combination of the first thermoplastic polyurethane, the second thermoplastic polyurethane, and the rubber at a temperature of greater than or equal to 130° C. to cure the first and second thermoplastic polyurethanes, vulcanize the rubber, and form the composite article (10).

Providing the First and Second Thermoplastic Polyurethanes and the Rubber:

The step of providing may be any known in the art. The first and/or second TPU may be provided in any form or way, such as in pelletized form. The first and/or second TPU may be pelletized, diced, or granulated. For example, the first and/or second TPU may be pelletized with an underwater pelletizer or a strand pelletizer. Similarly, the rubber may be provided in any form or way known in the art.

Extruding the Second Thermoplastic Polyurethane to Form the Tie Layer:

The second TPU (which may include the vulcanizing additive) may be extruded at a temperature of less than 130, 125, 120, 115, 110, 105, or 100° C. Alternatively, the second TPU and the vulcanizing additive may be extruded at any temperature between and including the aforementioned temperatures. The extrusion may be completed using any extruder, such as a twin-screw extruder, and any conditions that may be chosen by one of skill in the art. Typically, the step of extruding the second TPU forms the tie layer (14) of the composite article (10).

Disposing the First TPU on and in Direct Contact with the Tie Layer:

The step of disposing the first TPU may also be any known in the art. For example, the first TPU may be disposed on and in direct contact with the tie layer (14) by co- (or simultaneous) extrusion, by lamination, etc. The step of disposing the first TPU on and in direct contact with the tie layer (14) may be alternatively described as disposing the first TPU on and in direct contact with the second TPU.

Disposing the Rubber on and in Direct Contact with the Tie Layer:

The step of disposing the rubber may also be any known in the art. For example, the rubber may be disposed on and in direct contact with the tie layer (14) by co- (or simultaneous) extrusion, by lamination, etc. The step of disposing the rubber on and in direct contact with the tie layer (14) may be alternatively described as disposing the rubber on and in direct contact with the second TPU.

Heating the Combination of the First TPU, the Second TPU, and the Rubber:

The step of heating may also be accomplished by any way known in the art. Typically, the step of heating is further defined as heating at a temperature of greater than or equal to 130° C., e.g. up to 220° C., to cure the first and second thermoplastic polyurethanes, vulcanize the rubber, and form the composite article (10). The temperature may be any temperature or range of temperatures between and including those described above. In an additional embodiment, the step of heating comprises cross-vulcanizing the second thermoplastic polyurethane and the rubber.

Additional Embodiments

In one embodiment, the method includes the step of compounding the rubber (which is typically uncured). In another embodiment, the method includes the step of adding pellets of the second TPU to an extruder (e.g. a twin screw extruder) along with the vulcanizing additive. Subsequently, for example, the second TPU and the vulcanizing additive may be extruded at a temperature of less than 130° C., e.g. at a temperature described above. In other embodiments, pellets of the first TPU may be extruded as well. Two or three layers of the composite article (10) may be extruded together. For example, the first layer (12) and tie layer (14) may be extruded together. Alternatively, the second layer (16) and the tie layer (14) may be extruded together. Moreover, the first layer (12), the tie layer (14), and the second layer (16) may be extruded together. The terminology "extruded together" typically describes that the TPU and/or rubber for the layer is extruded and later formed into the layer itself. In one embodiment, the first layer (12) and the tie layer (14) are laminated onto the second layer (16). In a further embodiment, all three layers are pressed together with pressure and/or heat. In a further embodiment, the second thermoplastic polyurethane is extruded simultaneously with the first thermoplastic polyurethane and/or rubber.

EXAMPLES

A thermoplastic polyurethane (TPU 1) and a comparative thermoplastic polyurethane (TPU 2) are formed, as set forth below.

TPU 1 is the reaction product of a polybutadiene diol, a polyester diol, and an isocyanate component.

The polybutadiene diol has a weight average molecular weight of about 2,000 g/mol and an OH number of about 56 and is commercially available from Cray Valley USA.

The polyester diol has a weight average molecular weight of 3740 g/mol, an OH # of 30, and a melting point of 55° C. and is commercially available from Polyurethane Specialties Co. Inc.

The isocyanate component is 4,4'-MDI and is commercially available from BASF under the tradename of Lupranate M.

The thermoplastic polyurethane has a melt flow index measured at 120° C. and 22.6 kg of approximately 4 grams, per 10 minutes as measured according to ASTM 1238 and has a melting point of approximately 100° C. 0.2 grams of stannous octoate is also added.

TPU 2 is the reaction product of the aforementioned polybutadiene diol, a short chain diol (2-ethyl-1,3-hexanediol; different from the aforementioned polyester diol of this disclosure), and the 4,4'-MDI. 0.2 grams of stannous octoate is also added.

|  | TPU 1 | TPU 2 |
|---|---|---|
| Polybutadiene Diol | 851.5 | 777.1 |
| Polyester Diol | 44.8 | — |
| 2-ethyl-1,3-hexanediol | — | 47.2 |
| 4,4'-MDI | 103.5 | 175.5 |
| Stannous Octoate | 0.2 | 0.2 |

TPU 1 is extruded at approximately 120° C. to form a sheet having a thickness of approximately 1 mm. More specifically, the extrusion is completed using a Brabender Plasticorder equipped with a ¾ in. single screw extruder and adjustable sheet die.

TPU 2 melts above 130° C. and therefore cannot be extruded at 120° C.

The following extrusion equipment and parameters are utilized. The L/D is 16, and the barrel is equipped with 3 heating zones, each set to 120° C.

The following approximate physical properties of TPU 1 are measured, e.g. according to ASTM D412 or a similar method known in the art:

Tensile modulus: 165 psi (0.114 MPa)
Tensile strength (peak stress): 132 psi (0.0910 MPa)
Elongation at peak stress: 984%
Elongation at break: >1000%

The extrusion of the sheet of TPU 1 demonstrates that a thermoplastic polyurethane can be formed at temperatures below the typical temperatures of greater than or equal to 130° C. This also suggests that vulcanizing additives including sulfur can be utilized in the TPU because it is known that the risk for premature vulcanization and reaction typically begins around 130° C. Moreover TPU 1 will adhere to others TPUs and rubber following co-vulcanization of the sheet to the rubber.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure. All values and ranges of values including and between those set forth above are hereby expressly contemplated for use in various non-limiting embodiments.

One or more of the values described above may vary by ±5%, ±10%, ±15%, ±20%, ±25%, etc. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A composition comprising a thermoplastic polyurethane that is the reaction product of:
   A. a polybutadiene diol having a weight average molecular weight (Mw) of from 1,000 to 5,000 g/mol;
   B. a polyester diol having a melting point of from 40 to 90° C. and a weight average molecular weight (Mw) of from 2,000 to 5,000 g/mol;
   C. an isocyanate component, and
   D. a vulcanizing additive comprising sulfur in an amount of from 1 to 5 parts by weight per 100 parts by weight of said thermoplastic polyurethane,
   wherein said thermoplastic polyurethane has a melt flow index measured at 120° C. and 22.6 kg of from 0.5 to 50 grams, per 10 minutes as measured according to ASTM 1238, and has a melting point of from 50 to 120° C., and
   wherein the composition is free of polymers that are not said thermoplastic polyurethane.

2. The composition of claim 1 having a melt flow index measured at 120° C. and 22.6 kg of from 3 to 5 grams, per 10 minutes as measured according to ASTM 1238 and having a melting point of from 90 to 100° C.

3. The composition of claim 1 wherein said polybutadiene diol has a weight average molecular weight (Mw) of from 1,500 to 3,500 g/mol.

4. The composition of claim 1 wherein said polyester diol is a poly 1,6-hexanediol adipate.

5. The composition of claim 1 wherein said isocyanate component is 4,4'-methylenediphenyl isocyanate.

6. The composition of claim 1 that is free of a reaction product of one or more diols having 10 or less carbon atoms with an isocyanate.

7. A composite article comprising:
   (1) a first layer comprising a first thermoplastic polyurethane;
   (2) a second layer comprising a rubber; and
   (3) a tie layer sandwiched between and disposed in direct contact with both said first and second layers and comprising a second thermoplastic polyurethane,
   wherein said second thermoplastic polyurethane is made from the composition of claim 1.

8. The composite article of claim 7 wherein said first layer is further defined as a first outermost layer of said composite article.

9. The composite article of claim 7 wherein said second layer is further defined as a second outermost layer of said composite article.

10. The composite article of claim 7 that is further defined as a tire.

11. The composite article of claim 7 that is further defined as a shoe sole.

12. A method of forming the composite article of claim 7 comprising the steps of:
   (I) providing the first thermoplastic polyurethane, the second thermoplastic polyurethane, and the rubber;
   (II) extruding the second thermoplastic polyurethane at a temperature of less than 130° C. to form the tie layer;
   (III) disposing the first thermoplastic polyurethane on and in direct contact with the tie layer;
   (IV) disposing the rubber on and in direct contact with the tie layer; and
   (V) heating the combination of the first thermoplastic polyurethane, the tie layer, and the rubber at a temperature of greater than or equal to 130° C. to cure the first and second thermoplastic polyurethanes, vulcanize the rubber, and form the composite article.

13. The method of claim 12 wherein the second thermoplastic polyurethane is extruded simultaneously with the first thermoplastic polyurethane and/or the rubber.

14. The method of claim 13 wherein the step of heating comprises cross-vulcanizing the second thermoplastic polyurethane and the rubber.

* * * * *